W. M. BARRET.
HOSE REEL.
APPLICATION FILED SEPT. 26, 1912.
1,101,984.
Patented June 30, 1914.
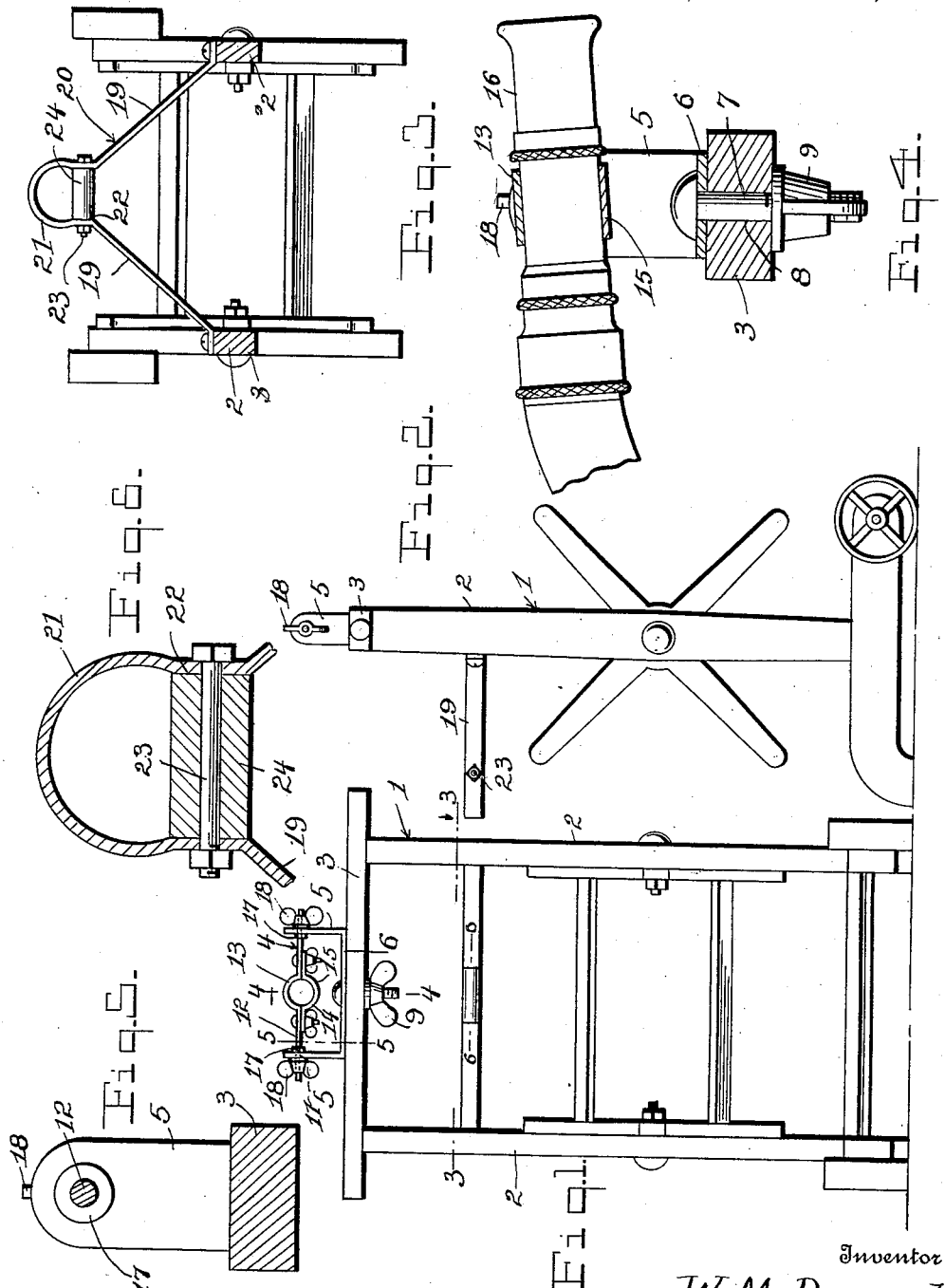
Inventor
W. M. Barret
By 
Attorneys
Witnesses
R. H. Jones

UNITED STATES PATENT OFFICE.

WILLIAM M. BARRET, OF SHREVEPORT, LOUISIANA.

HOSE-REEL.

1,101,984. Specification of Letters Patent. Patented June 30, 1914.

Application filed September 26, 1912. Serial No. 722,518.

*To all whom it may concern:*

Be it known that I, WILLIAM M. BARRET, a citizen of the United States, residing at Shreveport, in the parish of Caddo, State of Louisiana, have invented certain new and useful Improvements in Hose-Reels; and I do hereby declare the following to be a full, clear, and exact description of the invention, such as will enable others skilled in the art to which it appertains to make and use the same.

This invention relates to improvements in hose reels, and has for its object to so construct a reel that the hose nozzle may be held for directing the water in any direction and at any elevation.

A further object of the invention is to provide a device in the nature of an attachment which may be attached to any well known form of garden hose reel.

With these and other objects in view, this invention resides in the novel features of construction, formation, combinations and arrangements of parts to be hereinafter more fully described, claimed and illustrated in the accompanying drawing, in which:—

Figure 1 is a front elevation of a reel, showing the device in place thereon. Fig. 2 is a side elevation. Fig. 3 is a sectional view on line 3—3 of Fig. 1. Fig. 4 is a similar view on line 4—4 of Fig. 1. Fig. 5 is a similar view on line 5—5 of Fig. 1. Fig. 6 is a similar view on line 6—6 of Fig. 1.

Referring to the drawing, the numeral 1 designates a reel which consists of side bars 2 the upper ends of which are connected by the cross bar 3, all of which are of the usual construction.

The holder 4 consists of vertical arms 5 the lower ends of which are connected by a horizontal bar 6 having secured centrally thereof a partially threaded shank 7 which engages an aperture 8 formed in the cross bar 3 of the reel. Adjustably mounted on the shank 7 is a winged nut 9, the same being operable to firmly clamp the holder to the reel, or it may be operated to permit the holder to be rotated and then adjusted so that the nozzle 10 will direct the water where it is desired. The upper ends of the arms 5 are formed with perforations 11 in which are journaled the threaded ends of the bar 12, said bar being formed intermediate its ends with a depression 13. Adjustably mounted upon the bar 12 is a clamping member 14, the same having a depression 15 which is arranged in confronting relation with the depression 13 so that the nozzle 16 of the hose may be firmly clamped to the bar 12. Formed near the ends of the bar 12 are annular flanges 17 which bear against the inner faces of the arms 5 so that the winged nuts 18 may be manipulated to hold said bar in different adjusted positions so that the nozzle 16 may direct the water at different elevations.

Secured to the side bars 2 of the reel are the ends of the arms 19 of the hose guide 20, said arms having their outer ends connected to a loop 21, the mouth 22 thereof being bridged by a shaft 23 upon which is rotatably mounted a roller 24 which permits the hose to slide freely in the loop when it is being adjusted or unwound for clamping in the holder.

From this construction it will be seen that a reel has been provided having a holder mounted thereon which will permit a hose nozzle to be adjusted and held in any adjusted position desired.

What is claimed is:—

A nozzle holder consisting of a pair of spaced vertical arms having perforations formed in their upper ends and having their lower ends connected by a horizontal bar, a shank depending from a bar and adapted to pivotally engage the support, a second bar having its ends threaded and journaled in the perforations of the vertical arms, a depression formed centrally of the second named bar, a clamping member having a depression formed therein, adapted to confront the first named depression for clamping a hose nozzle, means for engaging the threaded ends of the second named bar to hold the same in different adjusted positions, and a guide carried by the support as and for the purpose set forth.

In testimony whereof I affix my signature in presence of two witnesses.

WILLIAM M. BARRET.

Witnesses:
T. C. BARRET,
E. DURINGER.

Copies of this patent may be obtained for five cents each, by addressing the "Commissioner of Patents, Washington, D. C."